US006177977B1

(12) United States Patent
Tanaka et al.

(10) Patent No.: US 6,177,977 B1
(45) Date of Patent: Jan. 23, 2001

(54) IMAGE FORMING APPARATUS AND CONTROLLING METHOD THEREOF

(75) Inventors: Tomoko Tanaka, Abiko; Takashi Nakahara, Moriya-machi; Hitoshi Ueki, Tsukuba; Kohei Maeda, Toride; Atsushi Wada, Toride; Hiroshi Fuse, Toride, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/467,178

(22) Filed: Dec. 20, 1999

(30) Foreign Application Priority Data

Dec. 22, 1998 (JP) ................................................ 10-365376

(51) Int. Cl.[7] ............................ G03B 27/32; G03B 27/52

(52) U.S. Cl. ................................ 355/26; 355/40; 355/24

(58) Field of Search ................................ 355/24, 26–29, 355/40, 41, 407, 77; 399/16, 21, 361–367; 271/3.1, 4, 225

(56) References Cited

U.S. PATENT DOCUMENTS 5,132,720 * 7/1992 Kioka et al. ........................... 355/24
5,212,517 * 5/1993 Yamada et al. ........................ 355/24
5,257,064 * 10/1993 Okamoto ................................ 355/24
5,597,153 * 1/1997 Maruyama et al. .................. 271/4.1

* cited by examiner

*Primary Examiner*—Russell Adams
*Assistant Examiner*—Henry Hung Nguyen
(74) *Attorney, Agent, or Firm*—Fitzpatrick, Cella, Harper & Scinto

(57) ABSTRACT

In a one-face mode, a first sheet discharge portion arranged on an upper face of an apparatus body, or a second sheet discharge portion arranged in the apparatus body so as to be freely opened and closed is opened, and a sheet forming an image on one surface thereof is discharged to this second sheet discharge portion. In a both-face mode, a sheet forming images on both surfaces thereof is conveyed to the first sheet discharge portion through a sheet discharge path formed by closing the second sheet discharge portion. When it is detected in the both-face mode that the second sheet discharge portion is opened on the basis of a detecting signal from a second sheet discharge portion open and close detecting portion, a controller controls the rotating direction of a forward and reverse rotatable conveying device on the basis of timer information from a timer device at the detecting time and the sheet forming the image on one surface thereof is conveyed to the first sheet discharge portion or the second sheet discharge portion, or a both-face conveying portion.

20 Claims, 7 Drawing Sheets

IMAGE FORMING APPARATUS AND CONTROLLING METHOD THEREOF

BACKGROUND OF THE INVENTION

1. Field of the Invention

The present invention relates to an image forming apparatus such as a laser printer capable of forming images on a front surface and a back surface of a sheet and a controlling method of this image forming apparatus, and particularly relates to an image forming apparatus having a both-face conveying portion for reversing surfaces of a sheet on one surface of which an image is formed and conveying the sheet to an image forming portion.

2. Related Background Art

There is a conventional image forming apparatus in which surfaces of a sheet on one surface of which an image is formed by an image forming portion is reversed and the sheet is again conveyed to the image forming portion and an image is formed on a back surface of the sheet.

For example, in an image recorder such as a laser printer as one example of the conventional image forming apparatus, a both-face conveying portion having a both-face conveying path for conveying the sheet to the image forming portion by reversing the surfaces of the sheet is optionally mounted to a relatively large-sized device operated at high speed and high in cost, and images are recorded to both surfaces of the sheet. Recently, a tendency to the requirement of a function for recording images to both surfaces of the sheet is increasing to save resources, etc. even in a laser printer, etc. made compact and operated at low speed and low in cost.

The conventional image recorder having such a both-face conveying portion has a one-face mode for forming an image on one surface of the sheet and a both-face mode for reversing by the both-face conveying portion the surfaces of the sheet on one surface of which an image is formed and conveying this reversed sheet to the image forming portion and forming an image on a back surface of the sheet.

Further, for example, a face-up tray is openably and closably arranged in an apparatus body to face-up-discharge the sheet on one surface of which the image is formed. In the one-face mode, the sheet is stored in a face-up state by opening this face-up tray.

When the sheet is stored in a face-down state in the one-face mode, the face-up tray is closed to form a sheet discharge path for conveying the sheet to a face-down storing portion arranged on an upper face of the apparatus body. Further, this face-up tray is closed in the both-face mode to form the sheet discharge path for conveying the sheet forming images on both surfaces thereof to the face-down storing portion and a conveying path to the both-face conveying portion.

However, when the sheet discharge path is formed by the face-up tray in this way, there is a case in which the sheet on one surface of which the image is formed is not conveyed to the both-face conveying portion but the sheet discharge path is jammed with the sheet when the face-up tray is opened in error particularly in the both-face mode.

SUMMARY OF THE INVENTION

Therefore, the present invention has been made in view of such a situation, and therefore has an object to provide an image recorder (image forming apparatus) able to be constructed such that no image recorder is jammed with a sheet even when a face-up tray is opened during a both-face mode.

The present invention resides in an image forming apparatus having a one-face mode for forming an image on one surface of a sheet and a both-face mode in which the sheet on one surface of which the image is formed is reversed and is again conveyed to an image forming portion through a both-face conveying portion and an image is formed on a back surface of the sheet, the image forming apparatus comprising:

a first sheet discharge portion for storing the sheet discharged after the image is formed on one surface or both surfaces of the sheet;

a second sheet discharge portion arranged openably and closably in the image forming apparatus for forming a sheet discharge path communicated with the first sheet discharge portion when the second sheet discharge portion is closed and for storing the sheet when the second sheet discharge portion is opened;

second sheet discharge portion open and close detecting means for detecting an opening and closing of the second sheet discharge portion;

conveying means arranged between the image forming portion and the second sheet discharge portion and conveying the sheet on which the image is formed;

forward and reverse rotatable conveying means which is arranged in the sheet discharge path so as to be rotatable forwardly and reversely and nips the sheet, on one surface of which the image is formed, conveyed by the conveying means and is forwardly rotated for a predetermined time period and is then reversely rotated and conveys the sheet to the both-face conveying portion;

means for detecting a position of the sheet in the sheet discharge path; and control means for controlling an operation of at least one of the forward and reverse rotatable conveying means and the conveying means so as to convey the sheet to one of the first sheet discharge portion, the second sheet discharge portion and the both-face conveying portion in accordance with the position of the sheet in the sheet discharge path when the sheet on one surface of which the image is formed is located in the sheet discharge path in the both-face mode and when the opening of the second sheet discharge portion is detected by the second sheet discharge portion open and close detecting means.

The control means preferably controls the operation of the conveying means so as to discharge the sheet to the second sheet discharge portion when the second sheet discharge portion is opened before the sheet reaches the forward and reverse rotatable conveying means.

The control means preferably performs a control operation for forwardly rotating the forward and reverse rotatable conveying means for a predetermined time period so as to discharge the sheet to the first sheet discharge portion when the second sheet discharge portion is opened after the forward and reverse rotatable conveying means nips the sheet having reached the forward and reverse rotatable conveying means and is forwardly rotated and before the forward and reverse rotatable conveying means is stopped for the reverse rotation.

The control means preferably performs a control operation for forwardly rotating the forward and reverse rotatable conveying means for a predetermined time period so as to discharge the sheet to the first sheet discharge portion when the second sheet discharge portion is opened while the forward and reverse rotatable conveying means is stopped in a nipping state of the sheet.

The both-face conveying portion preferably has a both-face conveying path for conveying the sheet conveyed from the forward and reverse rotatable conveying means to the image forming portion, and also has reversed sheet inducing means for inducing the sheet to the both-face conveying path, and the control means preferably performs a control operation for forwardly rotating the forward and reverse rotatable conveying means for a predetermined time period so as to discharge the sheet to the first sheet discharge portion when the second sheet discharge portion is opened before the sheet conveyed by the reverse rotation of the forward and reverse rotatable conveying means reaches the reversed sheet inducing means.

The both-face conveying portion preferably has a both-face conveying path for conveying the sheet conveyed from the forward and reverse rotatable conveying means to the image forming portion, and also has reversed sheet inducing means for inducing the sheet to the both-face conveying path, and the control means preferably performs a control operation for reversely rotating the forward and reverse rotatable conveying means for a predetermined time period so as to convey the sheet to the both-face conveying portion when the second sheet discharge portion is opened after the sheet conveyed by the reverse rotation of the forward and reverse rotatable conveying means reaches the reversed sheet inducing means.

The both-face mode is preferably stopped when the sheet is conveyed to the first or second sheet discharge portion.

The next printing operation is preferably received after the both-face mode is stopped.

The means for detecting the position of the sheet in the sheet discharging path preferably includes sheet detecting means for detecting passage of the sheet and time measuring means for starting a time measurement based on a detecting signal from the sheet detecting means, and the position of the sheet in the sheet discharge path is preferably detected by time measurement information of the time measuring means.

The present invention also resides in a controlling method of an image forming apparatus having a one-face mode for forming an image on one surface of a sheet and a both-face mode in which the sheet on one surface of which the image is formed is reversed and is again conveyed to an image forming portion through a both-face conveying portion and an image is formed on a back surface of the sheet;

the image forming apparatus comprising:

a first sheet discharge portion for storing the sheet discharged after the image is formed on one surface or both surfaces of the sheet;

a second sheet discharge portion arranged openably and closably in the image forming apparatus for forming a sheet discharge path communicated with the first sheet discharge portion when the second sheet discharge portion is closed and for storing the sheet when the second sheet discharge portion is opened;

second sheet discharge portion open and close detecting means for detecting the opening and closing of the second sheet discharge portion;

conveying means arranged between the image forming portion and the second sheet discharge portion and conveying the sheet on which the image is formed;

forward and reverse rotatable conveying means which is arranged in the sheet discharge path so as to be rotatable forwardly and reversely and nips the sheet, on one surface of which the image is formed, conveyed by the conveying means and is forwardly rotated for a predetermined time period and is then reversely rotated and conveys the sheet to the both-face conveying portion; and means for detecting a position of the sheet in the sheet discharge path; and an operation of at least one of the forward and reverse rotatable conveying means and the conveying means being controlled so as to convey the sheet to one of the first sheet discharge portion, the second sheet discharge portion and the both-face conveying portion in accordance with the position of the sheet in the sheet discharge path when the sheet on one surface of which the image is formed is located in the sheet discharge path in the both-face mode and when the opening of the second sheet discharge portion is detected by the second sheet discharge portion open and close detecting means.

DESCRIPTION OF THE PREFERRED EMBODIMENTS

The embodiments of the present invention will be explained in conjunction with the drawings.

Figure 1:
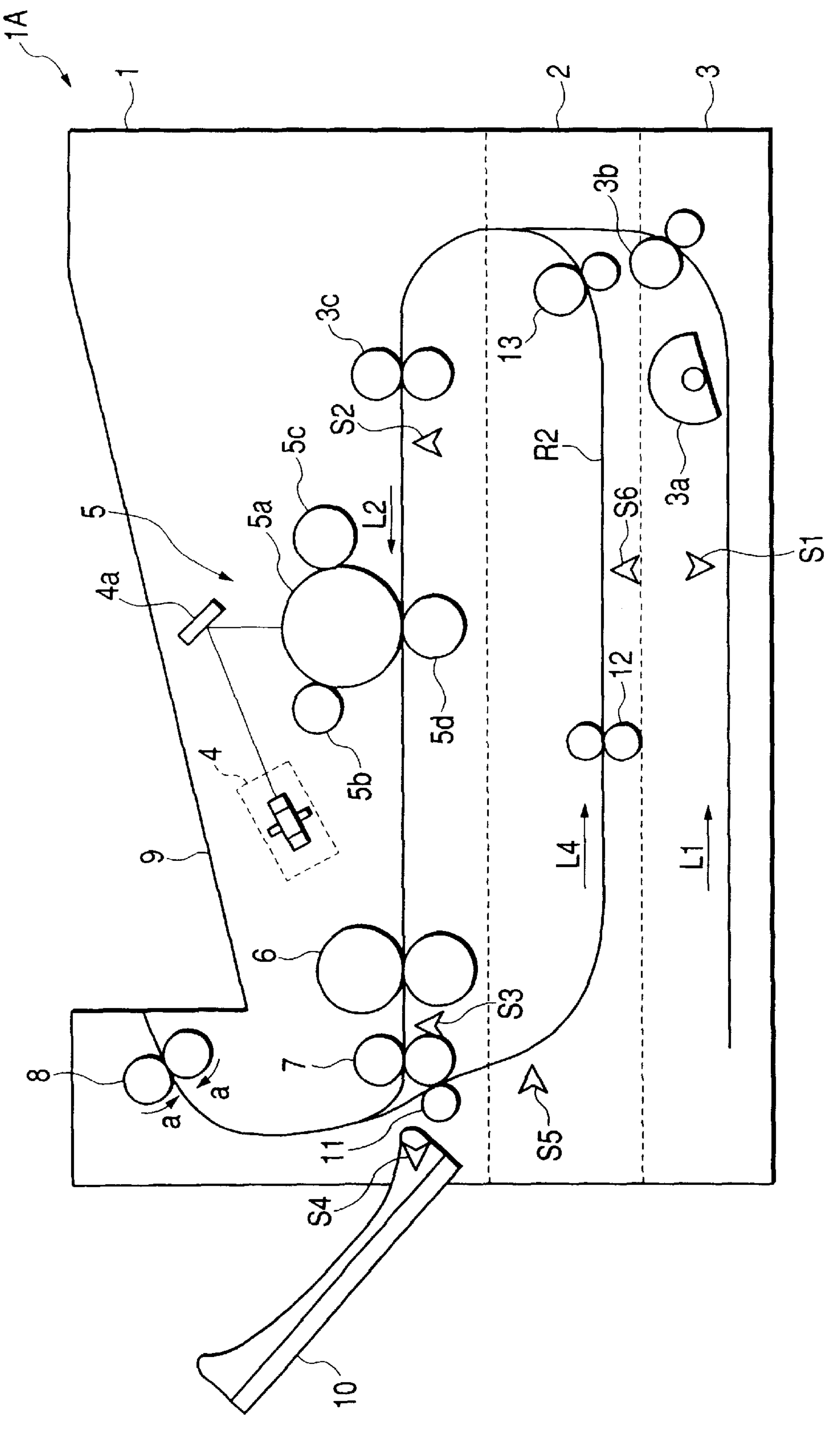
FIG. 1 is a view for explaining the schematic construction of a laser beam printer as one example of an image forming apparatus in accordance with an embodiment of the present invention.

FIG. 1 is a view for explaining the schematic construction of a laser beam printer as one example of an image forming apparatus in accordance with an embodiment of the present invention.

In FIG. 1, reference character 1A designates a laser beam printer. This laser beam printer 1A has a one-face mode for forming an image on one surface of a sheet of paper and a both-face mode for forming an image on a back surface of the sheet of paper on one surface of which an image is formed. Reference characters 1, 2, and 3 respectively designate a main body of a laser beam printer (hereinafter called a main body), a both-face conveying portion having a both-face conveying path R2 and detachably mountable to the main body 1, and a sheet cassette (paper cassette) for storing the unillustrated sheet of paper.

The sheet stored to this sheet cassette 3 is fed in a direction indicated by reference character L1 by operating a cassette sheet pickup roller 3*a* and a pair of conveying rollers 3*b*. Thereafter, the sheet is conveyed in a direction indicated by reference character L2 by operating a pair of conveying rollers 3*c*.

Reference numeral 4 designates a laser scanner unit. The laser scanner unit 4 raster-scans a laser beam on the basis of image data from a host computer, etc. described later and forms an electrostatic latent image by a reflecting mirror 4*a* on a photosensitive drum 5*a* charged by a charger 5*b* in advance. The electrostatic latent image formed on the photosensitive drum 5*a* is toner-developed by a developing device 5*c* and is then transferred in a transfer portion 5*d* to the sheet conveyed by the pair of conveying rollers 3*c*.

Further, the toner image transferred onto this sheet is fixed to the sheet by a thermal fixing device 6. This thermal fixing device 6 is constructed by an unillustrated heating member, a thermistor for detecting a temperature of this heating member, etc. such that heat and pressure are applied to the sheet terminated with respect to the transfer process and the toner image is fixed to the sheet.

Reference numeral 7 designates a pair of sheet discharge rollers constructing conveying means. The sheet passing through the thermal fixing device 6 is discharged by this pair of sheet discharge rollers 7 to a face-up tray 10 as a second sheet discharge portion, or a face-down sheet discharge portion 9 as a first sheet discharge portion arranged on an upper face of the main body 1. Here, the face-up tray 10 is arranged in the main body 1 so as to be openable and closable. When the sheet is discharged in a face-up state, this face-up tray 10 is opened as shown in FIG. 1.

Figure 2:
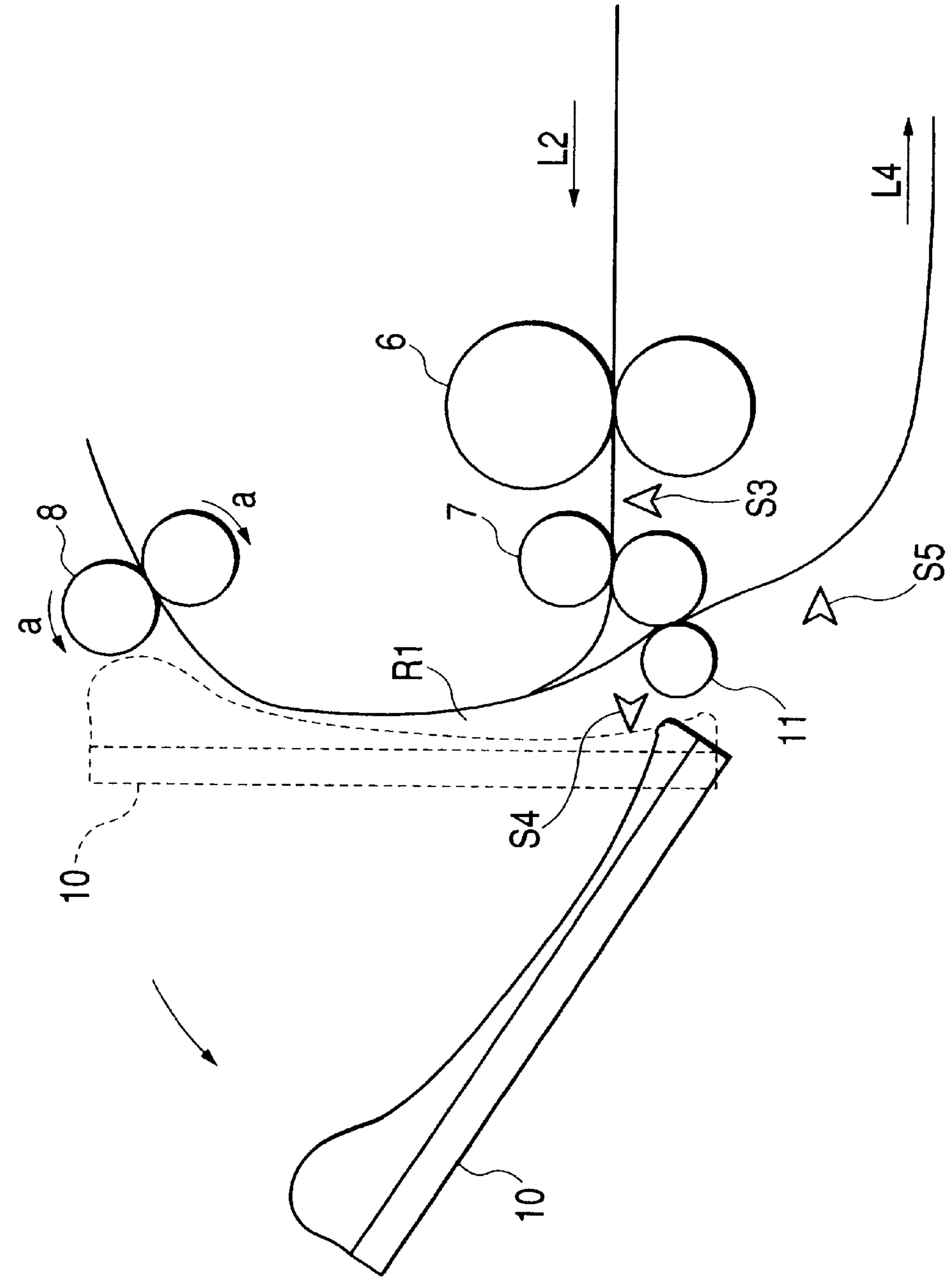
FIG. 2 is an enlarged view of a main portion of the laser beam printer.

In contrast to this, when the sheet is discharged in a face-down state, the face-up tray 10 is closed as shown by a broken line of FIG. 2. A sheet discharge path R1 for conveying the sheet to the face-down sheet discharge portion 9 is secured by closing the face-up tray 10 in this way. The sheet can be discharged to the face-down sheet discharge portion 9 in the one-face mode and the both-face mode by operating a pair of face-down sheet discharge rollers 8 as forward and reverse rotatable conveying means in the direction indicated by arrows a.

In the both-face mode, the face-up tray 10 is closed and the pair of face-down sheet discharge rollers 8 is forwardly rotated for a predetermined time period so that the sheet is conveyed toward the face-down sheet discharge portion 9. Thereafter, the pair of face-down sheet discharge rollers 8 is reversely rotated so that the sheet is conveyed toward the both-face conveying portion 2.

The sheet conveyed toward the both-face conveying portion 2 in this way is conveyed to the both-face conveying path R2 by a reversed sheet inducing roller 11 as reversed sheet inducing means. Further, the sheet conveyed to this both-face conveying path R2 is conveyed by a pair of reversed sheet conveying rollers 12 in a direction indicated by reference character L4. Thereafter, the sheet is stopped before a pair of reversed sheet re-feeding rollers 13 shown in FIG. 1 and is on standby until this sheet is re-fed as a sheet for a second surface (a back surface) of both-face printing.

In FIG. 1, reference character S6 designates a re-feeding sensor arranged in the both-face conveying portion 2. When this re-feeding sensor S6 detects that the sheet conveyed to the both-face conveying path R2 reaches a predetermined re-feeding position, the re-feeding sensor S6 outputs a detecting signal to an engine controller portion 14 as control means shown in FIG. 3 and described later.

The engine controller portion 14 stops rotations of the pair of reversed sheet conveying rollers 12 on the basis of the detecting signal from this re-feeding sensor S6 and sets the sheet to be on standby in the predetermined re-feeding position. Thereafter, the engine controller portion 14 operates the pair of reversed sheet re-feeding rollers 13 in predetermined timing. Thus, the sheet on standby in the both-face conveying path R2 is re-fed to the image forming portion 5 through the pair of conveying rollers 3*c*. Thereafter, this sheet is printed on the second surface (back surface) in both-face printing in a conveying path similar to that in the printing operation from the sheet cassette 3 described before. Thereafter, the sheet is discharged to the face-down sheet discharge portion 9.

In FIG. 1, reference characters S3 and S4 respectively designate a sheet discharge sensor as sheet detecting means for detecting that the sheet passes through the thermal fixing device 6, and a face-up tray open and close detecting sensor as second sheet discharge portion open and close detecting means for detecting that the face-up tray 10 is opened and closed. When this face-up tray open and close detecting sensor S4 detects that the face-up tray 10 is closed, the engine controller portion 14 performs face-down sheet discharge and sheet conveyance to the both-face conveying path R2 as already mentioned above.

In FIG. 1, reference characters S1 and S2 respectively designate a sheet sensor for detecting existence and nonexistence of the sheet in the sheet cassette 3, and a sheet feeding sensor for detecting a leading end and a trailing end of the sheet conveyed by operating the pair of conveying rollers 3*c*. The engine controller portion 14 judges image write timing on the basis of a detecting signal from this sheet feeding sensor S2. Reference character S5 designates a reversed sheet induction detecting sensor for detecting timing of the sheet conveyed to the both-face conveying path R2 and the leading and trailing ends of the sheet.

Figure 3:
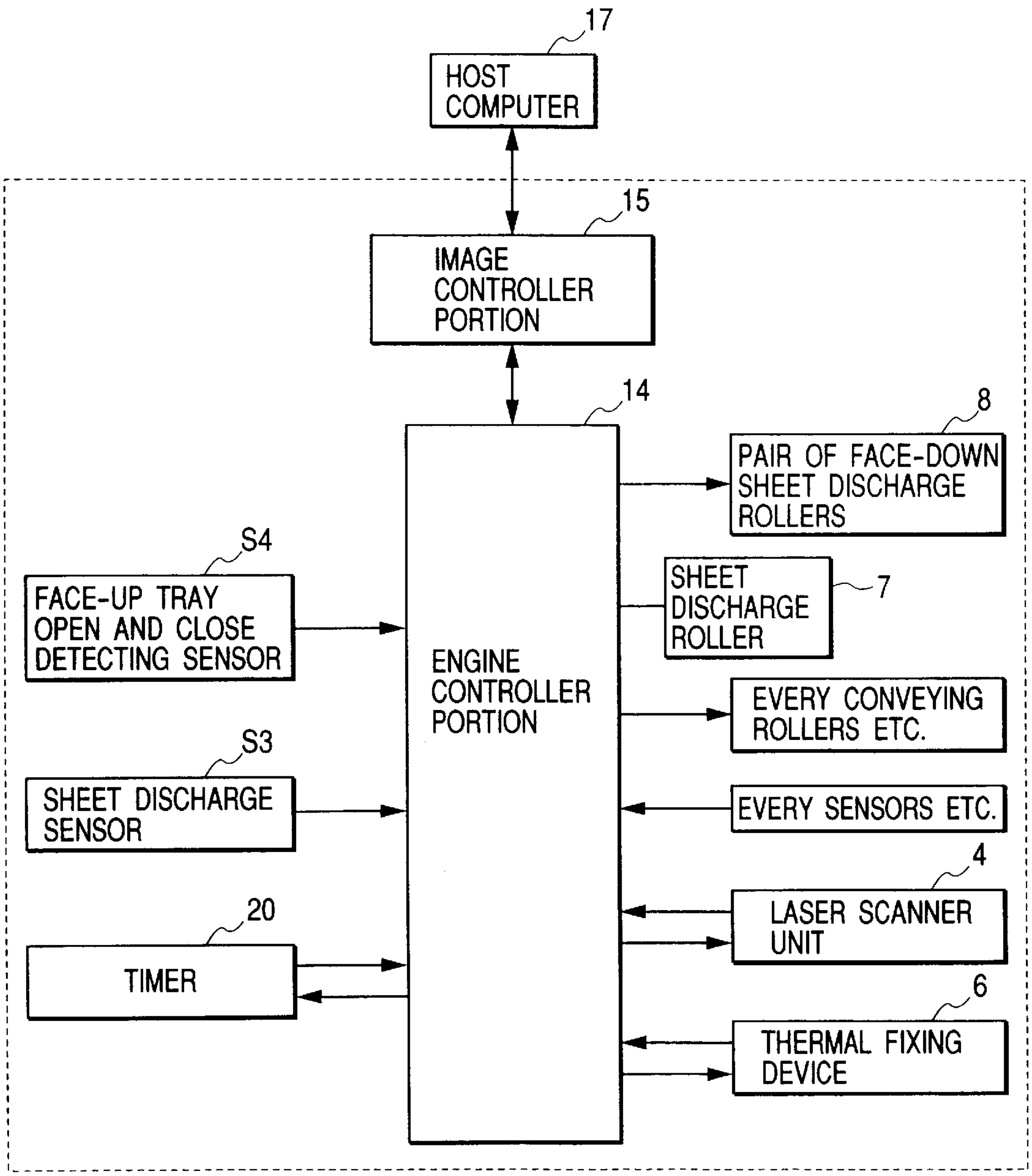
FIG. 3 is a control block diagram of the laser beam printer.

FIG. 3 is a block diagram of a printer controller portion for controlling the above series of printing operations. This printer controller portion is mainly constructed by the engine controller portion 14 and an image controller portion 15.

Here, the image controller portion 15 receives encoded image information (code data) from a host computer 17, etc. through an unillustrated external interface. Thereafter, the image controller portion 15 converts the code data into video data of a dot image and sends out printing commands to the engine controller portion 14 through an unillustrated video interface. Further, the image controller portion 15 sequentially sends out the video data to the engine controller portion 14 in synchronization with main scanning and subscanning synchronous signals from the engine controller portion 14.

The engine controller portion 14 also generally controls the operation of a printer engine such as the laser scanner unit 4, the thermal fixing device 6 by monitoring the operations of respective rollers such as the sheet discharge roller 7, the pair of face-down sheet discharge rollers 8, the pair of conveying rollers, etc. and inputs from the face-up tray open and close detecting sensor S4 and the other sensors. The engine controller portion 14 is also arranged to print the video data from the image controller portion 15 to the sheet.

Further, this engine controller portion 14 has a timer 20 as time measuring means as shown in FIG. 3. When a detecting signal from the sheet discharge sensor S3 is inputted to the engine controller portion 14, the engine controller portion 14 operates the timer 20 on the basis of this detecting signal and judges by time measurement information from this timer 20 that the sheet passing through the sheet discharge sensor S3 reaches the pair of face-down sheet discharge rollers 8.

When the engine controller portion 14 judges by the time measurement information from this timer 20 that the sheet has reached the pair of face-down sheet discharge rollers 8, the pair of face-down sheet discharge rollers 8 is forwardly rotated for a predetermined time period and is then stopped in the both-face mode. Thereafter, the pair of face-down sheet discharge rollers 8 is reversely rotated in a predetermined timing so that the sheet is fed to the both-face conveying portion 2.

When the face-up tray 10 is opened in error in such a both-face mode, a detecting signal for detecting the opening of the face-up tray 10 is inputted from the face-up tray open and close detecting sensor S4 to the engine controller portion 14. When this detecting signal is inputted to the engine controller portion 14, the engine controller portion 14 performs the following controls according to opening timing of the face-up tray 10, i.e., the time measurement information from the timer 20.

Namely, when the engine controller portion 14 judges in accordance with the time measurement information from the timer 20 that the face-up tray 10 is opened before the sheet reaches the pair of face-down sheet discharge rollers 8, the engine controller portion 14 continues the operation of the sheet discharge roller 7 for a predetermined time period. Thus, the sheet can be discharged to the face-up tray 10 even when the face-up tray 10 is opened and no sheet discharge path R1 can be formed.

Further, when the engine controller portion 14 judges that the face-up tray 10 is opened after the pair of face-down sheet discharge rollers 8 nips the sheet having reached the pair of face-down sheet discharge rollers 8 and is forwardly rotated and before the pair of face-down sheet discharge rollers 8 is stopped for reverse rotation, the engine controller portion 14 continues the forward rotation of the pair of face-down sheet discharge rollers 8 for a predetermined time period. Thus, the sheet can be discharged to the face-down sheet discharge portion 9 without jamming even when the face-up tray 10 is opened.

When the engine controller portion 14 judges that the face-up tray 10 is opened in a state in which the pair of face-down sheet discharge rollers 8 nips the sheet and is stopped, the engine controller portion 14 restarts the forward rotation of the pair of face-down sheet discharge rollers 8 for a predetermined time period. Thus, the sheet can be discharged to the face-down sheet discharge portion 9 without jamming even when the face-up tray 10 is opened.

When the engine controller portion 14 judges that the face-up tray 10 is opened after the pair of face-down sheet discharge rollers 8 is reversely rotated and before the sheet reaches the pair of reversed sheet inducing rollers 11, the engine controller portion 14 again rotates the pair of face-down sheet discharge rollers 8 forwardly. Thus, the sheet can be discharged to the face-down sheet discharge portion 9 without jamming even when the face-up tray 10 is opened.

When the engine controller portion 14 judges that the face-up tray 10 is opened after the sheet reaches the pair of reversed sheet inducing rollers 11, the sheet can be normally conveyed without having any influence on the conveyance of the sheet to the both-face conveying path R2 even when the face-up tray 10 is opened. Therefore, the printing operation in the normal both-face mode is continued even when the opening of the face-up tray 10 is detected.

A processing operation of the engine controller portion 14 constructed above will next be explained when the face-up tray 10 is opened in the both-face mode.

Figure 4:
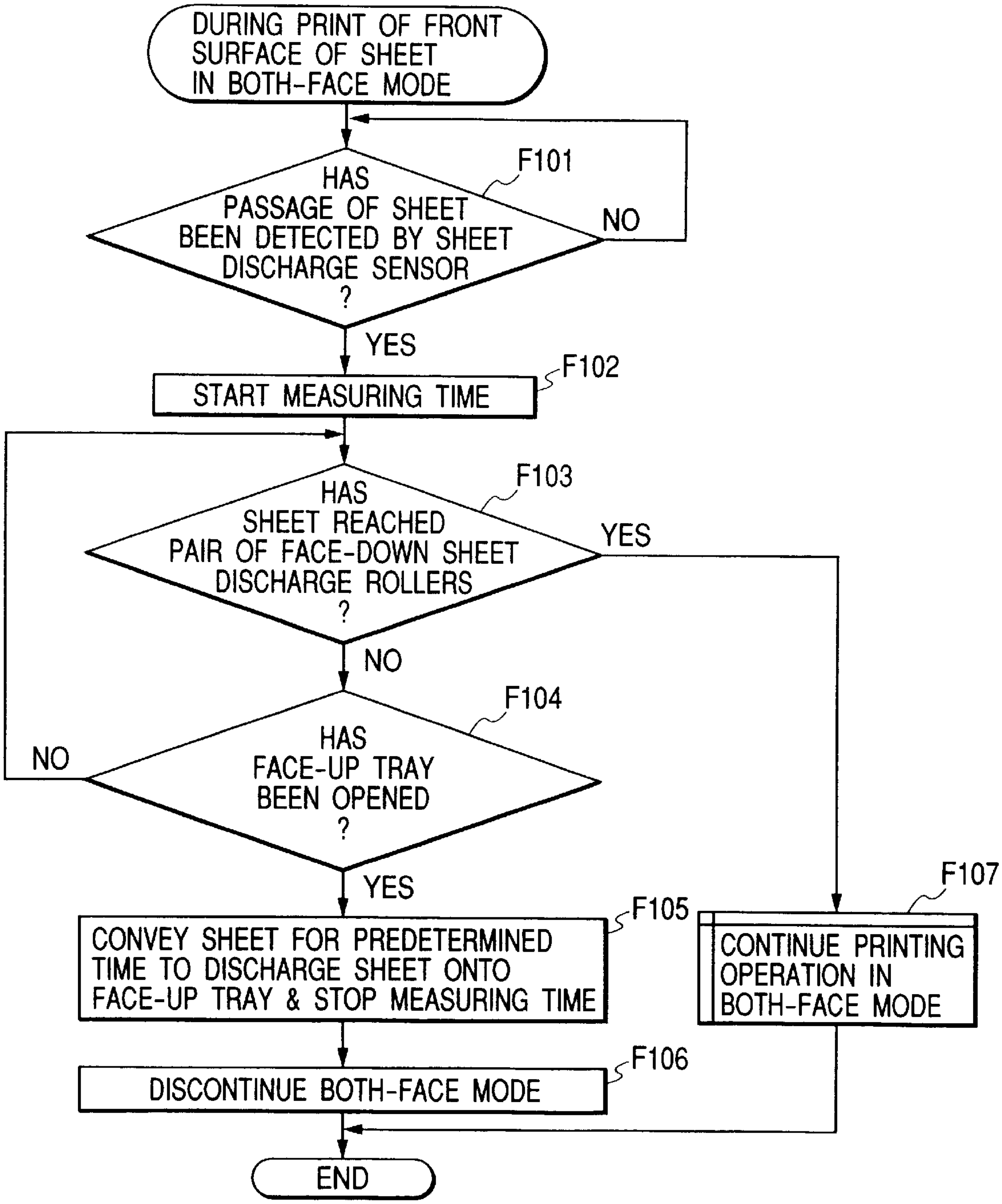
FIG. 4 is a flowchart for explaining a processing operation when a face-up tray is opened before a sheet in an engine controller portion of the laser beam printer reaches a pair of face-down sheet discharge rollers.

First, the processing operation of the engine controller portion 14 will be explained both-face mode in conjunction with a flowchart shown in FIG. 4 when the face-up tray 10 is opened as shown in FIG. 2 after transfer and fixture of an image on a first surface (front surface) of the sheet are completed in the both-face mode and before the conveyed sheet reaches the pair of face-down sheet discharge rollers 8.

When the sheet discharge sensor S3 detects passage of the sheet (YES of F101) after the printing operation is performed on the front surface of the sheet in the both-face mode, the timer 20 is operated and a measurement of time is started after the sheet has passed through the sheet discharge sensor S3 (F102). It is then judged by time measurement information from this timer 20 whether or not the sheet reaches the pair of face-down sheet discharge rollers 8 (F103). When it is judged that the sheet has reached the pair of face-down sheet discharge rollers 8 (YES of F103), thereafter the pair of face-down sheet discharge rollers 8 is forwardly rotated for a predetermined time period as already described and is then reversely rotated and the printing operation in the normal both-face mode is continued (F107).

In contrast to this, when the face-up tray 10 is opened before the sheet reaches the pair of face-down sheet discharge rollers 8 (NO of F103) and this opening is detected by a detecting signal from the face-up tray open and close detecting sensor S4 (YES of F104), the sheet is conveyed by continuously operating the sheet discharge roller 7 for a predetermined time period required to discharge the sheet to the face-up tray 10, and is discharged to the face-up tray 10. After the sheet is completely discharged, the measurement of time using the timer 20 is stopped (F105). Further, thereafter, the both-face mode is discontinued.

Thus, when the face-up tray 10 is opened in the both-face mode before the sheet completed with respect to the printing operation on the first surface reaches the pair of face-down sheet discharge rollers 8, the sheet is discharged to the face-up tray 10 as it is so that jamming of the sheet can be prevented. Further, after the sheet is completely discharged, the printing operation on the next page can be received by ending the both-face mode operation of this sheet.

Figure 5:
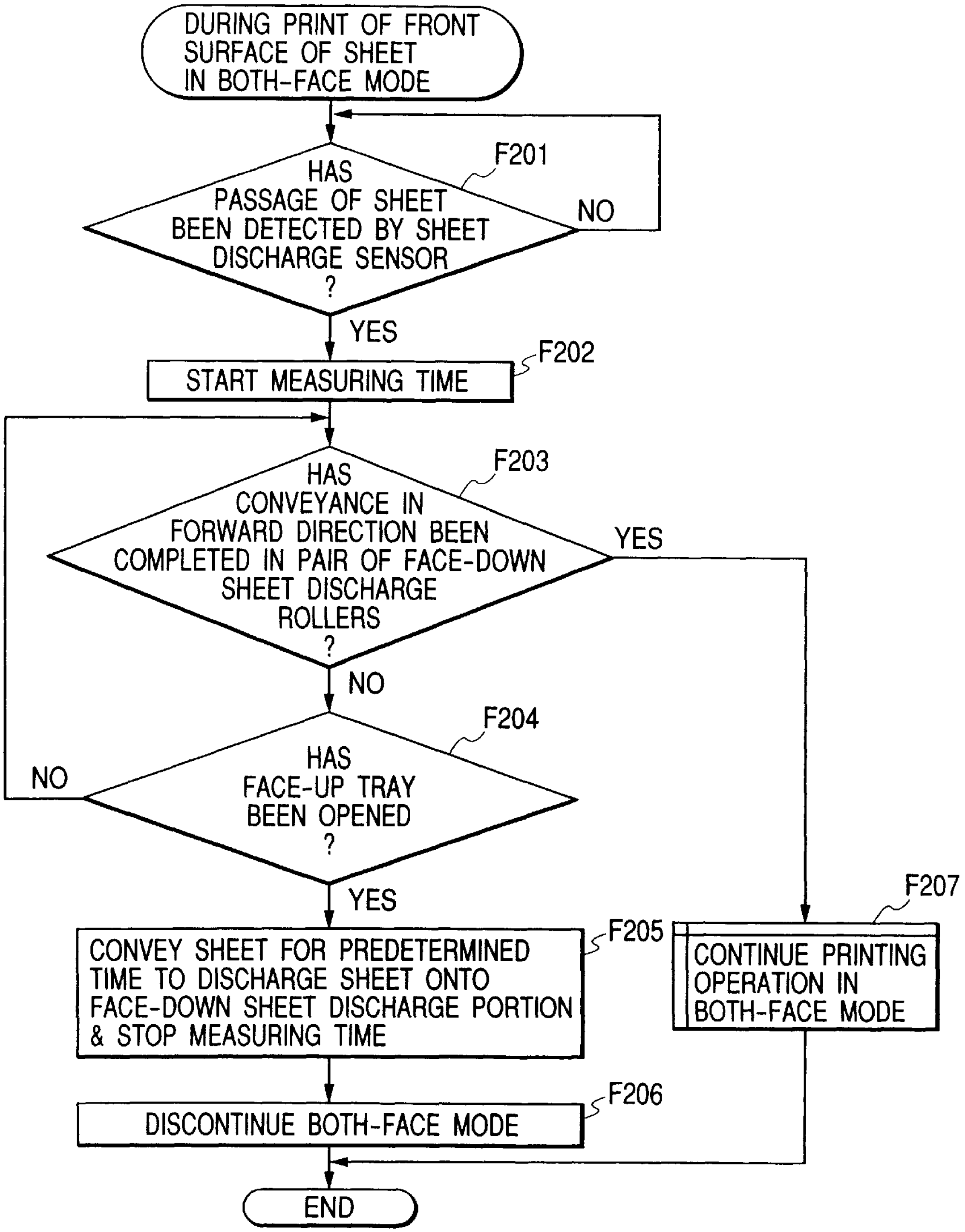
FIG. 5 is a flowchart for explaining a processing operation when the face-up tray is opened after the pair of face-down sheet discharge rollers of the engine controller portion begins to be forwardly rotated and before the pair of face-down sheet discharge rollers is stopped for reverse rotation.

Next, a processing operation when the face-up tray 10 is opened after the completion of the printing operation on the first surface and before a conveyance completing time of the sheet fed toward the face-down sheet discharge portion in the pair of face-down sheet discharge rollers 8, i.e., after the pair of face-down sheet discharge rollers 8 begins to be forwardly rotated and before the pair of face-down sheet discharge rollers 8 is stopped for reverse rotation will be explained in conjunction with a flowchart shown in FIG. 5.

When the sheet discharge sensor S3 detects passage of the sheet after the printing operation is performed on a front surface of the sheet in the both-face mode (YES of F201), the timer 20 is operated and the measurement of a time from the passage of the sheet in the sheet discharge sensor S3 is started (F202). It is then judged by time measurement information from this timer 20 whether or not the sheet reaches the pair of face-down sheet discharge rollers 8 and conveyance of the sheet in a predetermined forward direction (toward the face-down sheet discharge portion) is completed by a subsequent forward rotation of the pair of face-down sheet discharge rollers 8 for a predetermined time period (F203). When it is judged that the conveyance of the sheet in the predetermined forward direction is completed (YES of F203), the pair of face-down sheet discharge rollers 8 is then reversely rotated for a predetermined time period as already mentioned before so that the sheet is fed toward the both-face conveying portion 2 and the printing operation in the normal both-face mode is continued (F207).

In contrast to this, when the face-up tray 10 is opened before the pair of face-down sheet discharge rollers 8 conveys the sheet in the predetermined forward direction (NO of F203) and this opening is detected by a detecting signal from the face-up tray open and close detecting sensor S4 (YES of F204), the sheet is conveyed for a predetermined time period by continuing the forward rotation of the pair of face-down sheet discharge rollers 8 for a predetermined time period required to discharge the sheet to the face-down sheet discharge portion 9, and is discharged to the face-down sheet discharge portion 9. After the sheet is completely discharged, the measurement of time using the timer 20 is stopped (F205). Further, thereafter, the both-face mode is discontinued (F206).

Thus, when the face-up tray 10 is opened in the both-face mode before a conveyance completing time of the sheet completed with respect to the printing operation on the first surface in the forward direction using the pair of face-down sheet discharge rollers 8, the sheet is discharged to the face-down sheet discharge portion 9 as it is so that jamming of the sheet can be prevented. Further, after the sheet is completely discharged, the printing operation on the next page can be received by ending the both-face mode operation of this sheet.

Figure 6:
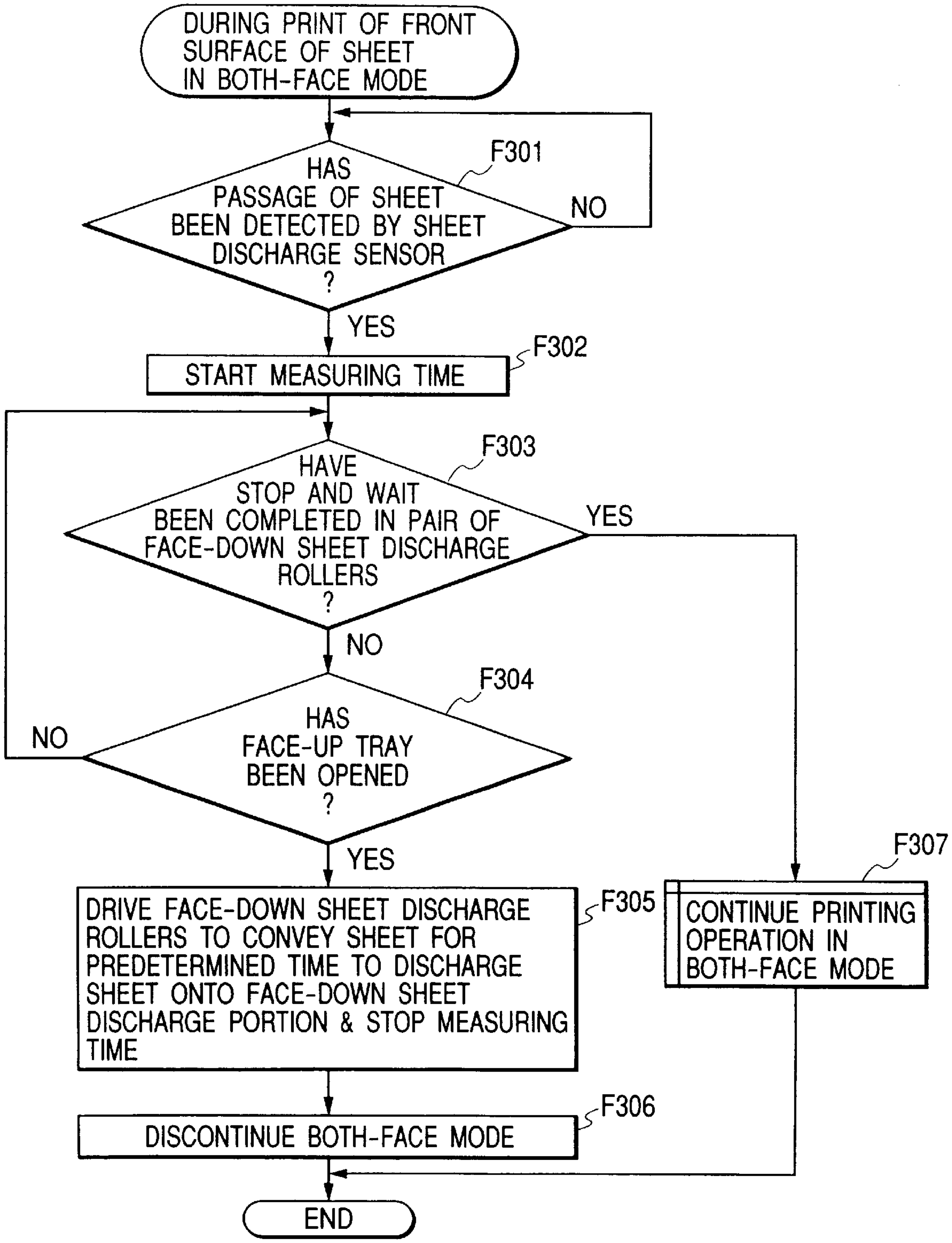
FIG. 6 is a flowchart for explaining a processing operation when the face-up tray is opened in a stopping state of the pair of face-down sheet discharge rollers of the engine controller portion.

Next, a processing operation when the face-up tray 10 is opened after the printing operation on the first surface is completed and during reverse conveyance standby in the pair of face-down sheet discharge rollers 8 will be explained in conjunction with a flowchart shown in FIG. 6.

When the sheet discharge sensor S3 detects passage of the sheet after the printing operation is performed on a front surface of the sheet in the both-face mode (YES of F301), the timer 20 is operated and the measurement of time from the passage of the sheet in the sheet discharge sensor S3 is started (F302).

After the sheet reaches the pair of face-down sheet discharge rollers 8 by time measurement information from this timer 20, the conveyance of the sheet in a predetermined forward direction is terminated by the forward rotation of the pair of face-down sheet discharge rollers 8 for a predetermined time period. Further, it is judged whether subsequent stop and wait of the pair of face-down sheet discharge rollers 8 is completed or not (F303). When it is judged that the stop and wait is completed (YES of F303), the pair of face-down sheet discharge rollers 8 is then reversely rotated for a predetermined time period as already described so that the sheet is fed toward the both-face conveying portion 2 and the printing operation in the normal both-face mode is continued (F307).

In contrast to this, when the face-up tray 10 is opened before the completion of the stop and wait of the pair of face-down sheet discharge rollers 8, i.e., in a stopping state of the pair of face-down sheet discharge rollers 8 (NO of F303) and this opening is detected by a detecting signal from the face-up tray open and close detecting sensor S4 (YES of F304), the sheet is conveyed by restarting the forward rotation of the pair of face-down sheet discharge rollers 8 for a predetermined time period required to discharge the sheet to the face-down sheet discharge portion 9, and is discharged to the face-down sheet discharge portion 9. After the sheet is completely discharged, the measurement of time is stopped (F305). Further, thereafter, the both-face mode is discontinued (F306).

Thus, when the face-up tray 10 is opened in the stopping state of the pair of face-down sheet discharge rollers 8 in the both-face mode, the sheet is discharged to the face-down sheet discharge portion 9 so that jamming of the sheet can be prevented. Further, after the sheet is completely discharged, the printing operation on the next page can be received by ending the both-face mode operation of this sheet.

Figure 7:
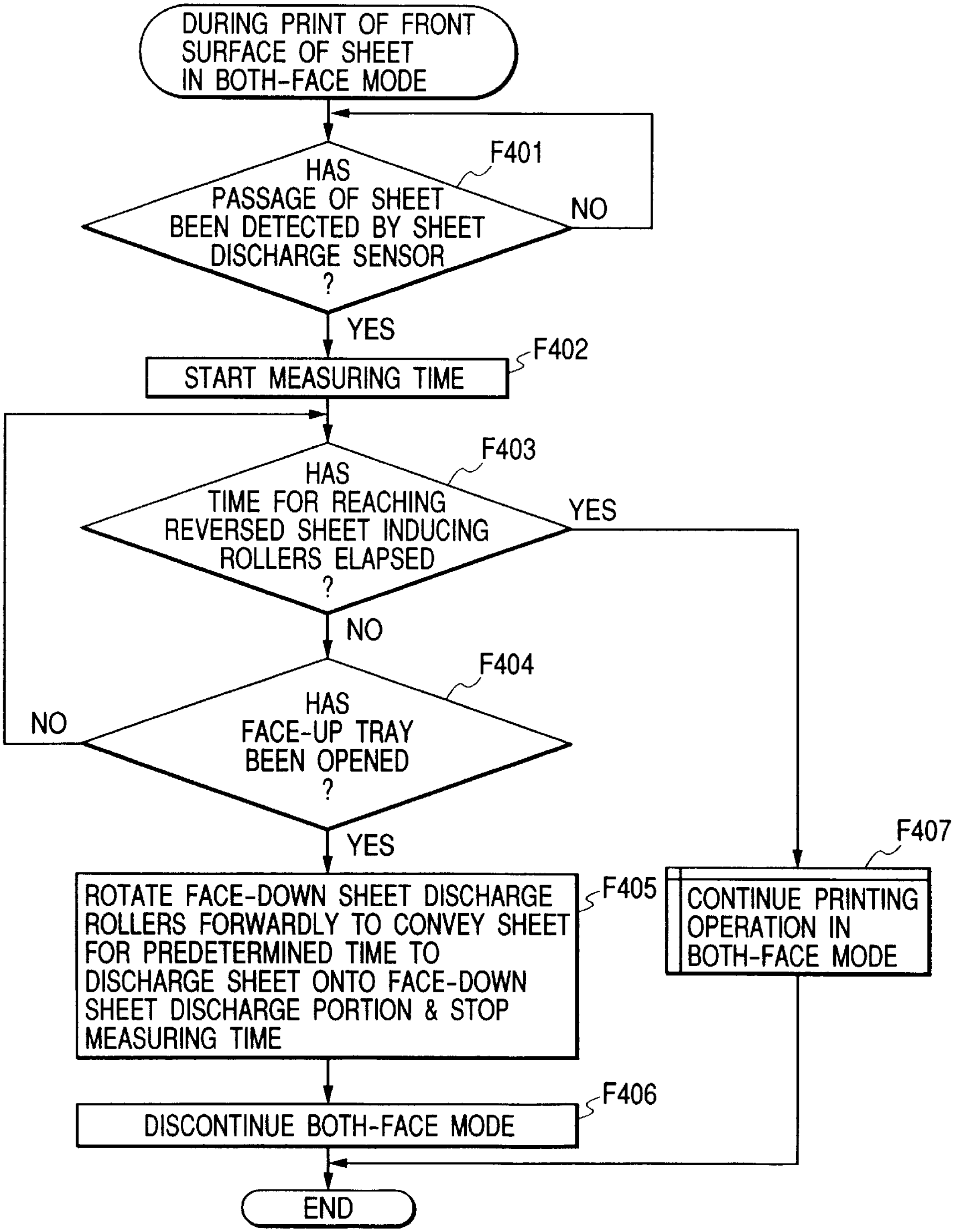
FIG. 7 is a flowchart for explaining a processing operation when the face-up tray is opened during reverse conveyance of the pair of face-down sheet discharge rollers of the engine controller portion.

Next, a processing operation when the face-up tray 10 is opened after the printing operation on the first surface is completed and during reverse conveyance of the sheet using the pair of face-down sheet discharge rollers 8 will be explained in conjunction with a flowchart shown in FIG. 7.

When the sheet discharge sensor S3 detects passage of the sheet after the printing operation is performed on a front surface of the sheet in the both-face mode (YES of F401), the timer 20 is operated and the measurement of time from the passage of the sheet in the sheet discharge sensor S3 is started (F402). The reverse rotation of the pair of face-down sheet discharge rollers 8 is started by time measurement information from this timer 20. Further, it is judged whether or not the sheet reaches the pair of reversed sheet inducing rollers 11 by this reverse rotation of the pair of face-down sheet discharge rollers 8 (F403). When it is judged that the sheet has reached the pair of reversed sheet inducing rollers 11 (YES of F403), the printing operation in the normal both-face mode is then continued (F407).

In contrast to this, when the face-up tray 10 is opened before the sheet reaches the pair of reversed sheet inducing rollers 11 (NO of F403), this opening is detected by a detecting signal from the face-up tray open and close detecting sensor S4 (YES of F404), and the sheet is conveyed by re-rotating the pair of face-down sheet discharge rollers 8 forwardly for a predetermined time period (reverse rotation) and is discharged to the face-down sheet discharge portion 9. After the discharge of the sheet is terminated, the measurement of time is stopped (F405). Further, thereafter, the both-face mode is discontinued (F406).

Thus, when the face-up tray 10 is opened in the both-face mode before the sheet completed with respect to the printing operation on the first surface reaches the pair of reversed sheet inducing rollers 11, the sheet is discharged to the face-down sheet discharge portion 9 by re-rotating the pair of face-down sheet discharge rollers 8 forwardly so that jamming of the sheet can be prevented. Further, after the sheet is completely discharged, the printing operation on the next page can be received by ending the both-face mode operation of this sheet.

When the sheet reaches the pair of reversed sheet inducing rollers 11 and begins to be conveyed by the pair of reversed sheet inducing rollers 11, the sheet can be normally conveyed without having any influence on the conveyance of the sheet to the both-face conveying path R1 even when the face-up tray 10 is opened. Therefore, the printing operation in the normal both-face mode is continued.

As explained above, in accordance with the present invention, when the face-up tray (a second sheet discharge portion) is opened in the both-face mode, a sheet on one surface of which an image is formed can be conveyed to the first or second sheet discharge portion or the both-face conveying portion by controlling a rotating direction of a both-face conveying means on the basis of time measurement information from time measuring means so that jamming of the sheet can be prevented. Thus, uselessness of the sheet can be omitted and the printing operation on the next page can be performed so that a user friendly image forming apparatus can be provided.

What is claimed is:

1. An image forming apparatus having a one-face mode for forming an image on one surface of a sheet and a both-face mode in which surfaces of said sheet on the one surface of which the image is formed are reversed and said sheet is again conveyed to an image forming portion through a both-face conveying portion and an image is formed on a back surface of said sheet, said image forming apparatus comprising:

a first sheet discharge portion for storing said sheet discharged after the image is formed on the one surface of said sheet or after the images are formed on the both surfaces of said sheet;

a second sheet discharge portion arranged so as to be openable and closable in said image forming apparatus for forming a sheet discharge path communicated with said first sheet discharge portion when said second sheet discharge portion is closed and for storing said sheet when said second sheet discharge portion is opened;

second sheet discharge portion open and close detecting means for detecting opening and closing of said second sheet discharge portion;

conveying means arranged between said image forming portion and said second sheet discharge portion for conveying said sheet on which the image is formed;

forward and reverse rotatable conveying means which is arranged in said sheet discharge path so as to be rotatable forwardly and reversely and nips said sheet, on the one surface of which the image is formed, conveyed by said conveying means and is forwardly rotated for a predetermined time period and is then reversely rotated to convey said sheet to said both-face conveying portion;

means for detecting a position of said sheet in said sheet discharge path; and control means for controlling an operation of at least one of said forward and reverse rotatable conveying means and said conveying means so as to convey said sheet to one of said first sheet discharge portion, said second sheet discharge portion and said both-face conveying portion in accordance with the position of said sheet in said sheet discharge path when said sheet on the one surface of which the image is formed is located in said sheet discharge path in said both-face mode and when the opening of said second sheet discharge portion is detected by said second sheet discharge portion open and close detecting means.

2. An image forming apparatus according to claim 1, wherein said control means controls the operation of said conveying means so as to discharge said sheet to said second sheet discharge portion when said second sheet discharge portion is opened before said sheet reaches said forward and reverse rotatable conveying means.

3. An image forming apparatus according to claim 1, wherein said control means performs a control operation for forwardly rotating said forward and reverse rotatable conveying means for a predetermined time period so as to discharge said sheet to said first sheet discharge portion when said second sheet discharge portion is opened after said forward and reverse rotatable conveying means is forwardly rotated while nipping said sheet having reached said forward and reverse rotatable conveying means and before said forward and reverse rotatable conveying means is stopped for the reverse rotation.

4. An image forming apparatus according to claim 1, wherein said control means performs a control operation for forwardly rotating said forward and reverse rotatable conveying means for a predetermined time period so as to discharge said sheet to said first sheet discharge portion when said forward and reverse rotatable conveying means is stopped in a nipping state of said sheet and when said second sheet discharge portion is opened.

5. An image forming apparatus according to claim 1, wherein said both-face conveying portion has a both-face conveying path for conveying said sheet conveyed from said forward and reverse rotatable conveying means to said image forming portion and has reversed sheet inducing means for inducing said sheet to said both-face conveying path, and wherein said control means performs a control operation for forwardly rotating said forward and reverse rotatable conveying means for a predetermined time period so as to discharge said sheet to said first sheet discharge portion when said second sheet discharge portion is opened before said sheet conveyed by reverse rotation of said forward and reverse rotatable conveying means reaches said reversed sheet inducing means.

6. An image forming apparatus according to claim 1, wherein said both-face conveying portion has a both-face conveying path for conveying said sheet conveyed from said forward and reverse rotatable conveying means to said image forming portion and has reversed sheet inducing means for inducing said sheet to said both-face conveying path, and wherein said control means performs a control operation for reversely rotating said forward and reverse rotatable conveying means for a predetermined time period so as to convey said sheet to said both-face conveying portion when said second sheet discharge portion is opened after said sheet conveyed by reverse rotation of said forward and reverse rotatable conveying means reaches said reversed sheet inducing means.

7. An image forming apparatus having a one-face mode for forming an image on one surface of a sheet and a both-face mode in which surfaces of said sheet on the one surface of which the image is formed are reversed and said sheet is then again conveyed to an image forming portion and an image is formed on a back surface of said sheet, said image forming apparatus comprising:

a first sheet discharge portion for storing said sheet discharged after the image is formed on the one surface of said sheet or the images are formed on the both surfaces of said sheet;

a second sheet discharge portion arranged openably and closably in said image forming apparatus for forming a sheet discharge path communicated with said first sheet discharge portion when said second sheet discharge portion is closed and for storing said sheet when said second sheet discharge portion is opened;

second sheet discharge portion open and close detecting means for detecting opening and closing of said second sheet discharge portion;

conveying means arranged between said image forming portion and said second sheet discharge portion for conveying said sheet on which the image is formed;

forward and reverse rotatable conveying means which is arranged in said sheet discharge path so as to be rotatable forwardly and reversely and nips said sheet, on the one surface of which the image is formed, conveyed by said conveying means and is forwardly rotated for a predetermined time period and is then reversely rotated to convey said sheet to a both-face conveying portion, said both-face conveying portion having a both-face conveying path for conveying said sheet conveyed by reverse rotation of said forward and reverse rotatable conveying means to said image forming portion and reversed sheet inducing means for inducing said sheet to said both-face conveying path;

means for detecting a position of said sheet in said sheet discharge path; and control means for performing a control operation such that when said second sheet discharge portion is opened before said sheet on the one surface of which the images is formed in said both-face mode reaches said forward and reverse rotatable conveying means, said conveying means is rotated for a predetermined time period so as to discharge said sheet to said second sheet discharge portion, when said second sheet discharge portion is opened after said sheet reaches said forward and reverse rotatable conveying means and before said sheet reaches said reversed sheet inducing means, said forward and reverse rotatable conveying means is forwardly rotated for a predetermined time period so as to discharge said sheet to said first sheet discharge portion, and when said second sheet discharge portion is opened after said sheet reaches said reversed sheet inducing means, said forward and reverse rotatable conveying means is reversely rotated for a predetermined time period so as to convey said sheet to said both-face conveying portion.

8. An image forming apparatus according to any one of claims 1 to 7, wherein said both-face mode is stopped when said sheet is conveyed to said first or said second sheet discharge portion.

9. An image forming apparatus according to claim 8, wherein a next printing operation is received after said both-face mode is stopped.

10. An image forming apparatus according to any one of claims 1 to 7, wherein the means for detecting the position of said sheet in said sheet discharge path has sheet detecting means for detecting passage of said sheet and time measuring means for starting a measurement of time based on a detecting signal from said sheet detecting means, and the position of said sheet in said sheet discharge path is detected by time measurement information of said time measuring means.

11. A controlling method of an image forming apparatus having a one-face mode for forming an image on one surface of a sheet and a both-face mode in which surfaces of said sheet on the one surface of which the image is formed are reversed and said sheet is again conveyed to an image forming portion through a both-face conveying portion and an image is formed on a back surface of said sheet, said image forming apparatus comprising:

a first sheet discharge portion for storing said sheet discharged after the image is formed on the one surface of said sheet or the images are formed on the both surfaces of the sheet;

a second sheet discharge portion arranged so as to be openable and closable in said image forming apparatus for forming a sheet discharge path communicated with said first sheet discharge portion when said second sheet discharge portion is closed and for storing said sheet when said second sheet discharge portion is opened;

second sheet discharge portion open and close detecting means for detecting opening and closing of said second sheet discharge portion;

conveying means arranged between said image forming portion and said second sheet discharge portion for conveying said sheet on which the image is formed;

forward and reverse rotatable conveying means which is arranged in said sheet discharge path so as to be rotatable forwardly and reversely and nips said sheet, on the one surface of which the image is formed, conveyed by said conveying means and is forwardly rotated for a predetermined time period and is then reversely rotated to convey said sheet to said both-face conveying portion; and means for detecting a position of said sheet in said sheet discharge path, wherein said controlling method controls an operation of at least one of said forward and reverse rotatable conveying means and said conveying means so as to convey said sheet to one of said first sheet discharge portion, said second sheet discharge portion and said both-face conveying portion in accordance with the position of said sheet in said sheet discharge path when the sheet on the one surface of which the image is formed is located in said sheet discharge path in said both-face mode and when the opening of said second sheet discharge portion is detected by said second sheet discharge portion open and close detecting means.

12. A controlling method of an image forming apparatus according to claim 11, wherein the operation of said conveying means is controlled so as to discharge said sheet to said second sheet discharge portion when said second sheet discharge portion is opened before said sheet reaches said forward and reverse rotatable conveying means.

13. A controlling method of an image forming apparatus according to claim 11, wherein a control operation for forwardly rotating said forward and reverse rotatable conveying means for a predetermined time period is performed so as to discharge said sheet to said first sheet discharge portion when said second sheet discharge portion is opened after said forward and reverse rotatable conveying means is forwardly rotated while nipping said sheet having reached said forward and reverse rotatable conveying means and before said forward and reverse rotatable conveying means is stopped for reverse rotation.

14. A controlling method of an image forming apparatus according to claim 11, wherein a control operation for forwardly rotating said forward and reverse rotatable conveying means for a predetermined time period is performed so as to discharge said sheet to said first sheet discharge portion when said forward and reverse rotatable conveying means is stopped in a nipping state of said sheet and when said second sheet discharge portion is opened.

15. A controlling method of an image forming apparatus according to claim 11, wherein said both-face conveying portion has a both-face conveying path for conveying said sheet conveyed from said forward and reverse rotatable conveying means to said image forming portion and has reversed sheet inducing means for inducing said sheet to said both-face conveying path, and wherein a control operation for forwardly rotating said forward and reverse rotatable conveying means for a predetermined time period is performed so as to discharge said sheet to said first sheet discharge portion when said second sheet discharge portion is opened before said sheet conveyed by reverse rotation of said forward and reverse rotatable conveying means reaches said reversed sheet inducing means.

16. A controlling method of an image forming apparatus according to claim 11, wherein said both-face conveying portion has a both-face conveying path for conveying said sheet conveyed from said forward and reverse rotatable conveying means to said image forming portion and has reversed sheet inducing means for inducing said sheet to said both-face conveying path, and wherein a control operation for reversely rotating said forward and reverse rotatable conveying means for a predetermined time period is performed so as to convey said sheet to said both-face conveying portion when said second sheet discharge portion is opened after said sheet conveyed by reverse rotation of said forward and reverse rotatable conveying means reaches said reversed sheet inducing means.

17. A controlling method of an image forming apparatus having a one-face mode for forming an image on one surface of a sheet and a both-face mode in which surfaces of said sheet on the one surface of which the image is formed are reversed and said sheet is then again conveyed to an image forming portion and an image is formed on a back surface of said sheet, said image forming apparatus comprising:

a first sheet discharge portion for storing said sheet discharged after the image is formed on the one surface of said sheet or the images are formed on the both surfaces of said sheet;

a second sheet discharge portion arranged so as to be openable and closable in said image forming apparatus for forming a sheet discharge path communicated with said first sheet discharge portion when said second sheet discharge portion is closed and for storing said sheet when said second sheet discharge portion is opened;

second sheet discharge portion open and close detecting means for detecting opening and closing of said second sheet discharge portion;

conveying means arranged between said image forming portion and said second sheet discharge portion for conveying said sheet on which the image is formed;

forward and reverse rotatable conveying means which is arranged in said sheet discharge path so as to be rotatable forwardly and reversely and nips said sheet, on the one surface of which the image is formed, conveyed by said conveying means and is forwardly rotated for a predetermined time period and is then reversely rotated to convey said sheet to said both-face conveying portion;

a both-face conveying portion having a both-face conveying path for conveying said sheet conveyed by reverse rotation of said forward and reverse rotatable conveying means to said image forming portion and reversed sheet inducing means for inducing said sheet to said both-face conveying path; and means for detecting a position of said sheet in said sheet discharge path, wherein said controlling method controls such that when said second sheet discharge portion is opened before said sheet on the one surface of which the image is formed in said both-face mode reaches said forward and reverse rotatable conveying means, said conveying means is rotated for a predetermined time period so as to discharge said sheet to said second sheet discharge portion, when said second sheet discharge portion is opened after said sheet reaches said forward and reverse rotatable conveying means and before said sheet reaches said reversed sheet inducing means, said forward and reverse rotatable conveying means is forwardly rotated for a predetermined time period so as to discharge said sheet to said first sheet discharge portion, and when said second sheet discharge portion is opened after said sheet reaches said reversed sheet inducing means, said forward and reverse rotatable conveying means is reversely rotated for a predetermined time period so as to convey said sheet to said both-face conveying portion.

18. A controlling method of an image forming apparatus according to any one of claims 11 to 17, wherein said both-face mode is stopped when said sheet is conveyed to said first or said second sheet discharge portion.

19. A controlling method of an image forming apparatus according to claim 18, wherein a next printing operation is received after said both-face mode is stopped.

20. A controlling method of an image forming apparatus according to any one of claims 11 to 17, wherein the means for detecting the position of said sheet in said sheet discharge path has sheet detecting means for detecting passage of said sheet and time measuring means for starting a measurement of time based on a detecting signal from said sheet detecting means, and the position of said sheet in said sheet discharge path is detected by time measurement information of said time measuring means.

* * * * *

UNITED STATES PATENT AND TRADEMARK OFFICE
CERTIFICATE OF CORRECTION

PATENT NO. : 6,177,977 B1
DATED : January 23, 2001
INVENTOR(S) : Tomoko Tanaka, et al.

It is certified that error appears in the above-identified patent and that said Letters Patent is hereby corrected as shown below:

Column 13,
Line 21, "is" should read -- are --.

Signed and Sealed this

Twenty-third Day of October, 2001

*Attest:*

Nicholas P. Godici

NICHOLAS P. GODICI

*Attesting Officer* *Acting Director of the United States Patent and Trademark Office*